Dec. 15, 1953 E. R. FERRARI 2,662,426
SAW TOOTH SHAPER WITH WEAR FACES
Filed Nov. 16, 1951 2 Sheets-Sheet 2

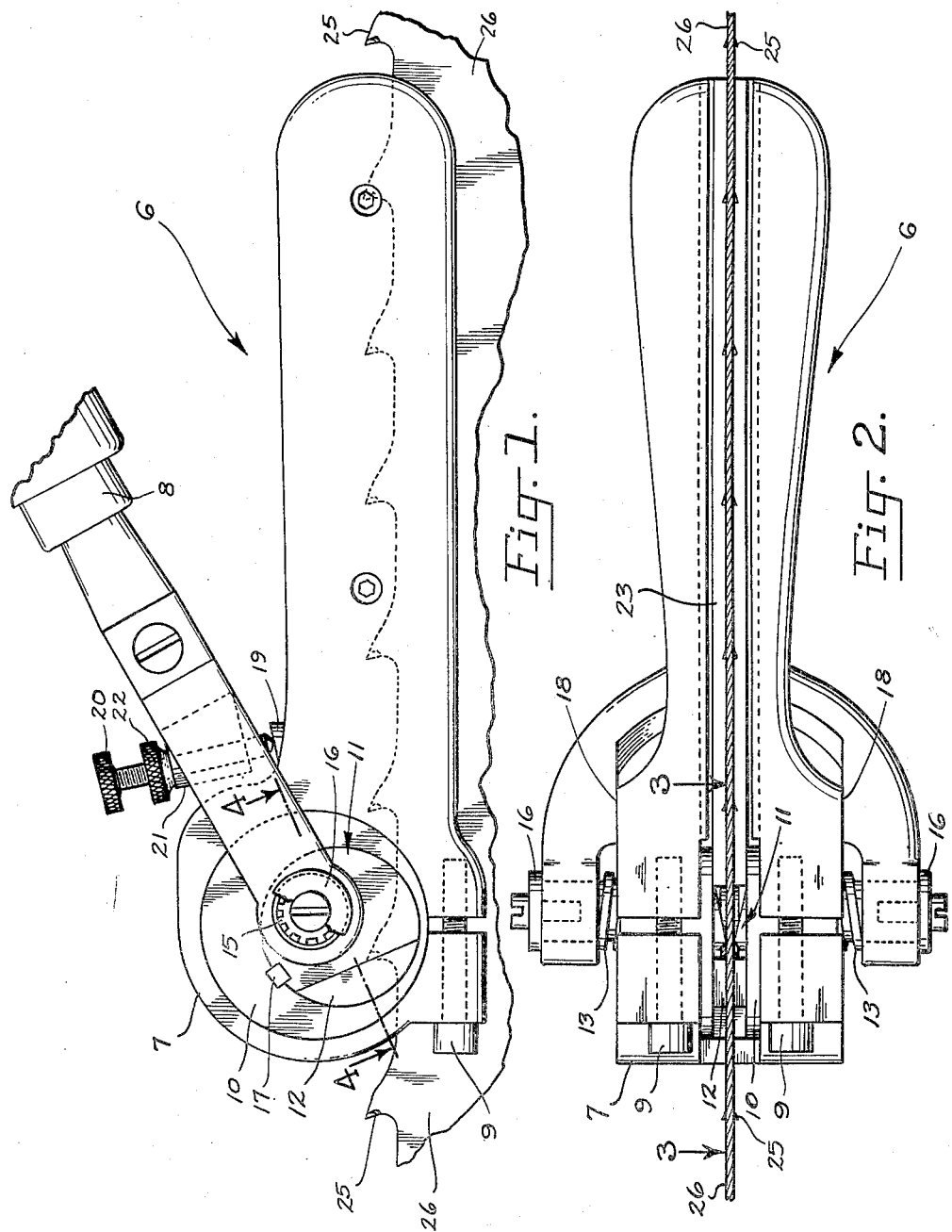

INVENTOR.
Ernest R. Ferrari
BY
Atty.

Patented Dec. 15, 1953

2,662,426

UNITED STATES PATENT OFFICE 2,662,426

SAW TOOTH SHAPER WITH WEAR FACES

Ernest R. Ferrari, Vancouver, Wash.

Application November 16, 1951, Serial No. 256,711

5 Claims. (Cl. 76—54)

This invention relates to a saw tooth shaper and, more particularly, to an improved compression die for such a shaper. Generally, the instant invention is an improvement upon the shaper described in the United States patent to Ferrari, 2,201,766.

In reforming the teeth of a saw blade after they have become dull with use, a swedge is used to upset the metal of each tooth. The swedged portion of a tooth is made more broad than the original of the dull tooth so that sufficient metal will be available for the shaping operation which is to follow. After swedging, a shaper which is equipped with a pair of forming or compression dies is moved into position over the teeth of the saw blade. One by one, each tooth is squeezed and is compressed back into shape by the dies, the critical dimensions and angles of the original tooth being reformed in the upset metal so that three or four sharpening or filing operations thereafter can be performed before another swedge or shaping operation is required. The instant invention is concerned with a pair of compression dies which will squeeze and compress a swedged tooth in the above described manner. In particular, the invention provides a more practical die having an effective useful life span which is much longer than the life span of those dies heretofore employed in the sawing art. Economically, of course, these factors aim toward the provision of a better quality die at a lower cost.

In forming a compression die, the cost of machining frequently is the largest single item of expense. The necessity of keeping this cost to a minimum has caused much time to be consumed in study and in the conduct of experiments with various die constructions. The die of this invention is the culmination of such a course of study and experimentation. Thus, that type of compression die with which I here am concerned is formed from a body member bounded by an arcuate periphery which terminates at a plane end face, and by an inner and an outer plane side face. The die body is tapped or otherwise machined to form a heavy, yet precise and accurate internal thread pattern which is adapted to mate with a lead screw for moving the die to and from the squeeze or compression position. Additionally, the die body is provided with a longitudinal keyway and with a dual angle corner bevel, one such bevel defining the die face work area which contacts the saw tooth during compression. Speaking practically, the die faces of such a compression die must be formed to and must mate, in pairs, to define a pocket which is accurate to a few ten thousandths of an inch. Accordingly, the dimensions of the die face, the internal thread pattern, and the keyway are critical and they must be formed and machined precisely and accurately. In physical attributes, such a compression die must be easily machined to allow the ready and inexpensive formation of the above listed elements at a minimal cost, the die must not distort under pressure or at elevated temperatures, it must have a hard, wear resistant, and non-deforming die face, and neither the body nor the die face must crack or chip under the repeated compressive forces which develop during the shaping operation. It is the prime object of my invention to provide a die which meets the above listed requirements, yet which can be produced at a price competitive with those shaper dies heretofore employed.

In service of the above objective, I provide a die body which is formed of a mild steel, such as a medium carbon content steel (0.25 to 0.50 per cent), and a die face which is formed from a hard or tool steel, such as a high carbon content (above 0.50 percent) or an alloy steel. The most obvious advantage of such a die is that the body is easily machined whereas the die face is wear resistant. Additionally and in combination, the die body provides a yielding mass in which the hard die face will remain accurately aligned, yet will give somewhat under high compression forces. Thus, I combine the body and die face elements by recessing a pocket within the mild steel body and by welding a hard steel insert in this pocket. Thereafter, the body and insert are dressed off and beveled to provide a flush even surface having the same overall dimensions as a die formed entirely of mild steel. In total then, this dual element, yet integral compression die provides a hard steel work face which effectively will resist wear and which is embedded within and surrounded by a mild steel body so the repeated impact and compression forces of a shaping operation will be absorbed and cushioned. Additionally, the required internal thread pattern and longitudinal keyway easily are machined in the mild steel body either before or after the insert is in place and the die face itself is formed with a minimal machining effort since a minimal portion thereof is hard steel.

Other advantages and objects of my invention will be described with reference to the dies of the prior art and to the experiments and study previously mentioned. Thus, I have formed, and some of the prior art teaches the formation of compression dies by heat treatment of a mild steel body followed by a rapid oil or water quench. These dies, however, have proven impractical for several reasons. Firstly, the internal thread pattern and the keyway, which are machined to a tolerance of a few ten thousandths of an inch prior to heat treatment, tend to distort and become misaligned by the hardening treatment. Without the treatment, of course, the die faces are too soft and, after treatment, the internal thread pattern and the keyway are extremely difficult to machine because of the hardened metal which must be removed. Secondly, correct control of the quenching operation is difficult to achieve with a small die body such as here is under consideration. Accordingly, cracks, fissures, and planes and areas of reduced strength are likely to form if the die body is heat treated and quenched in this manner. Such a heat treated die, then, is one type over which the die of the instant invention is an improvement.

In other controlled experiments, I have riveted and/or screwed a hard steel plate to each of the die faces. These plates overlie the body of the die and serve the function of a die face. However, experience in the art has shown that such plates will crack and chip adjacent the screw or rivet holes under repeated use. Furthermore, it is next to impossible to align such plates with that precision which is required in a die of this character. Still further, a single hard steel plate can protect but one side of the die and this leaves the other side of the die exposed to wear. On the other hand, if two plates are used on each die, alignment and positioning of the die face is extremely difficult.

Continuing, a case hardening, as by carbonizing or nitriting, and a hard facing, as with a welded alloy overlay or coating, also are impractical. The former lack strength in depth and are subject to the hazard which is known in the art as a "corner effect" leading to brittle chipping and a short life span whereas the latter is far too expensive and is difficult to use where the die face is formed on a corner. Other methods of localized hardening, such as induction and flame hardening, also distort the die body and the critical machined surfaces, are too expensive, and, structurally, are inappropriate because of the shallow depth to which the hardening treatment penetrates. Thus, the instant invention also possesses certain advantages in contrast with and is an improvement over compression dies of the several latter types.

In improvement over the dies listed above, a further object of my invention is to provide a die in which the wearing parts are hardened to a substantial depth. Thus, after a prolonged period of use, the critical wear surfaces of the die are deep enough so they may be reformed and remachined. To the best of my knowledge, an inexpensive die which is chip and wear resistant to a substantial depth is unknown in the prior art.

The above and other inventive objects and advantages inherent in and encompassed by my novel compression dies will become apparent from the ensuing description, taken in conjunction with the accompanying drawings, wherein:

Figs. 1 and 2 are related side and bottom views, respectively, showing a saw tooth shaper which embodies the principles of my invention, the shaper itself being shown at rest upon a section of saw blade;

Figure 3:
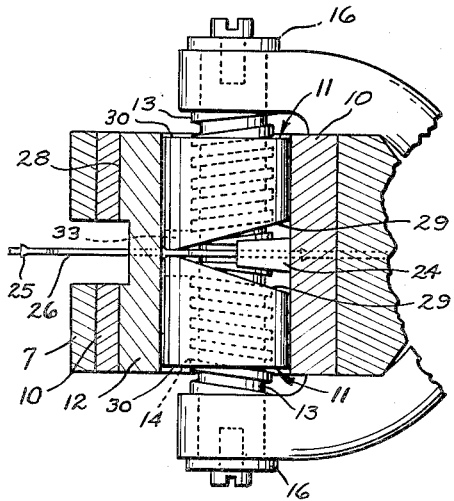
Fig. 3 is an enlarged cross-sectional detail view, taken substantially on the line 3—3 of Fig. 2, showing one of the compression dies with the hard steel insert thereof in position to shape a saw tooth.

In Figs. 1 and 2, the shaper embodying my invention includes an elongated body portion or frame member 6, having a tubular head 7 at one end. A bifurcated lever and handle portion 8 is mounted for pivotal movement with respect to this head. Further, the head of the shaper body 7 is split laterally across the bottom and a pair of screws 9 cooperate therewith to define a C-clamp. The clamp, in turn, encircles and carries a journaled barrel member 10 having a transverse hollow bore of circular cross-section formed therein. It is this transverse bore which carries the two mated compression dies 11 and an anvil tooth stop 12. Thus, as best shown in Fig. 3, the anvil tooth stop is provided with a cutaway portion 12a and the face of the anvil spans the distance between and abuts the dies. These three elements, together, form a circular outline of cylindrical shape which fits complementarily within the hollow bore of the barrel.

Figure 4:
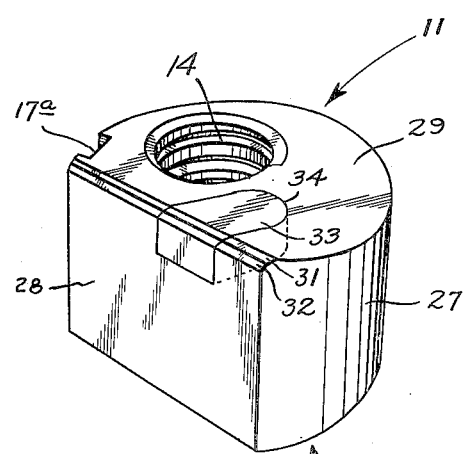
Fig. 4 is an enlarged sectional detail view, taken substantially on the line 4—4 of Fig. 1, more particularly indicating the manner in which two of my compression dies mate to define a pocket in which a saw tooth is being shaped.

As shown in Figs. 2 and 4, a lead screw 13, carrying two opposite hand threads, cooperates with the machined thread pattern 14 which passes longitudinally through the body of each of the compression dies 11. A rotation of the lead screw 13 will cause the dies 11 to move longitudinally or endwise toward and away from one another. Accordingly, the lead screw and the thread patterns, together, define a means with machined surfaces for moving the dies equal and opposite distances. As heretofore has been mentioned, these means must be formed to precise dimensions (measured in ten thousandths of an inch) so the dies will function accurately.

As shown in that portion of Fig. 1 which is broken away, the end of the lead screw 13 is serrated, as at 15. The lever 8, in turn, is bifurcated so that each half thereof may engage one of the serrated lead screw ends. As is conventional, a screw and cap device 16 holds these elements together. Accordingly, when the handle 8 is rotated counter-clockwise, as viewed in Fig. 1, the compression dies 11 will move away from one another. A clockwise rotation will move the dies toward one another. Rotation of the dies and the anvil tooth stop within the barrel 10, on the other hand, is prevented by the square key 17 which cooperates with the longitudinal keyway 17a formed in the barrel and the dies. Lateral displacement of the barrel member, in turn, is prevented by the slidable engagements between the bifurcated portions of the handle 8 and the barrel as indicated at 18 in Fig. 2.

To preselect the end of the operating stroke of the lever and handle 8, a stop button 19 is set into the body of the shaper and a cooperating adjustment screw 20 threadably is carried by a projection portion 21 of the operating lever and handle. A lock nut 22 also is provided and the end of the adjustment screw 20 abuts the stop button 19 to stop the closure of the dies at a distance slightly exceeding the gauge of the saw blade.

The longitudinal axis of the shaper body 6 is defined by a slot 23 which traverses the length thereof. Within this slot, a tooth rest bar 24 is mounted. It is this tooth rest bar 24 upon which the teeth 25 of the saw blade 26 will come to rest when the shaper is positioned thereover. Thus, this tooth rest bar defines a means for supporting the shaper upon the teeth of the saw blade in a fixed position relative to the longitudinal axis of the latter.

Figure 5:
Fig. 5 is a perspective view of one of the dies, the lower face of the hard steel insert being indicated in dashed outline.

Referring to the details of the complementary compression dies 11, each such die includes an elongated mild steel body member of generally semi-cylindrical form (see Fig. 5). This semi-cylindrical form is bounded by an arcuate periphery 27 terminating at a plane end face or a slabbed off portion 28. It is the plane end face 28 on each die which abuts the aforementioned anvil tooth stop 12. Further, the semi-cylindrical body member is bounded at the sides by a forming or inner face 29 and by an outer plane side face 30.

As best indicated in Fig. 5, one edge of the die body member is bounded by the end face 28 and the inner face 29 where these faces meet at an acute angle. This portion of the die defines a die face work area and it is formed with two intersecting bevel planes 31 and 32. In forming the die body, the bevel 32 first is cut across the corner and, thereafter, the bevel 31 is cut at an angle thereto so the overall width of the bevel 32 may be selected by machining the bevel 31 to a greater or lesser width. However, it is the bevel 32 which is the actual die face and which contacts the sides of one of the teeth 25 during the shaping operation.

In further differentiation to and improvement over those compression dies heretofore employed, I provide an elongated hard steel insert piece 33 which is welded to and fixed within a recessed pocket of complementary shape formed within the mild steel body. As explained previously, this hard steel may be a tool steel, a high carbon steel, or an alloy steel. In any event, the terminal end of the insert piece is formed on an arcuate sweep 34 and the two exposed surfaces of the piece lie flush with the forming or inner face 29 and the end face 28, respectively. In length, the insert piece 33 extends in from the end face 28 a distance at least as great as one third the radius of the arcuate periphery 27. Further, each of the insert pieces 33 is so positioned within the corresponding compression die 11 that the longitudinal axes of the two insert pieces define a plane which includes the aforementioned longitudinal axis of the frame member of body 6. Thus, when the dies and the anvil tooth stop correctly are positioned within the barrel member 10, the teeth 25 will rest in substantial alignment with the longitudinal axes of the hard steel inserts 33.

In forming one of the dies 11, the threads 14 first are machined within the body and the key way 17a is formed. Thereafter, a plane tipped router is used to form the recessed pocket in which the hard steel insert piece 33 rests. This router is moved in from the plane end face 28 toward the arcuate periphery 27 so the rounded or curved end 34 of the pocket will be of the same diameter as the diameter of the router. After the pocket is formed, a low melting point weld material and flux are spread over the surface of an insert piece 33 and the insert is placed or forced into position within the pocket. Thereafter, a gas flame torch is used to heat the margins of the insert piece to melt the weld material. This latter operation will not distort the threads 14 since the heat is localized and the temperature required to melt the weld is very low (usually, less than 600 degrees F.). After cooling the die, the two bevels 32 and 31 are machined, sequentially, this latter operation requiring a minimal effort since the hard steel insert extends along the corner of the die for a minimal distance.

In use, the shaper is moved into position over the saw blade 26 until the teeth 25 rest upon the tooth rest bar 24 in a fixed position relative to the longitudinal axis of the shaper. The shaper then is moved forward (to the left in Figs. 1, 2 and 3) until one of the teeth 25 ride over the cutaway portion 12a of the tooth stop 12. Thereafter, the shaper is backed up (to the right in the drawings) until the face of the said one tooth comes to rest against the tooth stop. The length of the insert 33 is such that the tooth rubs on hard steel only during both these latter movements. The handle and lever member 8 then is rotated (clockwise as shown in Fig. 1) to the position shown in Fig. 1. This rotation causes the dies 11 to move toward one another and that portion of each of the bevels or die faces 32 which is formed on the insert pieces 33 squeezes and compresses the sides of the tooth. After one such shaping operation is completed, the shaper once more is moved forward, backward, and the operation is repeated, in sequence. This continues until all of the teeth are shaped.

After the saw tooth shaper of my invention has been used for several months, the compression dies 11 must be reformed. This most easily is accomplished by removing the dies from the barrel member 10 and grinding down the forming or inner plane faces 29. Thereafter, the bevels 32 and 31 are machined, sequentially, as heretofore has been described. This reforming operation points out another advantage of my improved die. Thus, because the hard steel insert pieces 33 are formed of a substantial thickness (approximately one-half the width thereof), I have found that the die can be reformed in excess of 15 times before it must be discarded. That is to say, in excess of 15 grinding or machining operations may be performed upon the forming or inner plane face 29 before the body and insert are worn and machined down sufficiently to reach the approximate bottom of the pocket in which the hard steel insert piece 33 rests. One reason that my dies are superior to case hardened, hard faced, or coated dies is that these successive reforming operations may be performed without, in any manner, jeopardizing the critical dimensions or angles of the die. Further, because of the substantial depth of the insert pieces, my improved dies will last six to ten years longer than other dies.

In summary, I have provided a compression shaper die which is more practical to operate since the die face thereof accurately is positioned yet will give slightly under stress. Further, this die is less expensive to form since no expensive case or face hardening techniques are employed and, lastly, the die has a useful life span far exceeding that of dies hitherto known.

I claim:

1. In a saw tooth shaper, an elongated frame member carrying means for supporting the shaper upon the teeth of a saw blade in a fixed position relative to the longitudinal axis of the frame member, a pair of compression dies operatively carried by said frame member for movement laterally with respect to said longitudinal axis and endwise with respect to one another, each of the compression dies having a mild steel body bounded on two sides by a plane end face and a plane inner side face, said plane faces intersecting at a die face work area and together bounding an acute angle which forms one corner of the die body, and an elongated insert piece of tool steel welded to and fixed within a pocket of complementary shape recessed in the mild steel body, two of the faces of each insert lying flush with the respective plane faces of the corresponding die and the remainder of each insert being surrounded by the mild steel body member, each of said die face work areas being beveled in two intersecting planes across both the body and the insert portions thereof, that exposed face of each insert which lies flush with a plane side face extending in a longitudinal direction back along the body member a distance greater than twice the combined widths of said bevels.

2. As an article of manufacture, a compression die for a saw tooth shaper, comprising a mild steel body member bounded by an arcuate periphery terminating at a plane end face and by plane side faces, the boundary line between the end face and one of the side faces defining that edge of the body which is the die face work area for the compression die, and an elongated hard steel insert piece fixed within a recess pocket of complementary shape formed within said mild steel body, said pocket extending into the body member from the end face toward the arcuate periphery at an oblique angle to the former and for a distance at least as great as one third the radius of the arcuate periphery, the terminal end of the pocket being formed on an arcuate sweep, said pocket also extending into the body member from the inner side face toward the outer side face.

3. A compression die for a saw tooth shaper, comprising a mild steel body of generally semi-cylindrical form, the semi-cylindrical form of said body member being bounded by an arcuate periphery terminating at a plane end face and by inner and outer plane side faces, the boundary line between the end face and the inner side face defining that edge of the body which is the die face work area for the compression die, an elongated insert piece of tool steel fixed within a recess pocket of complementary shape formed within said mild steel body, said pocket extending into the body member from the end face toward the arcuate periphery at an oblique angle to the former and for a distance at least as great as one third the radius of the arcuate periphery, said pocket also extending into the body member from the inner side face toward the outer side face, said insert piece having a substantial depth and having two plane exposed surfaces which are parallel and flush with the inner side face and end face, respectively, with the remainder of the insert piece being completely surrounded by the mild steel body, and a bevel plane cutting laterally across both the insert piece and the body member at said die face work area.

4. A compression die for a saw tooth shaper, comprising an elongated mild steel body member of generally semi-cylindrical form, the semi-cylindrical form of said body member being bounded by an arcuate periphery terminating at a plane end face and by plane side faces, said end face and inner side face bounding an acute angle corner at one edge of the body, a selected portion of the vertex of said angle defining the die face work area of the compression die, the boundary line between the end face and the inner face defining that edge of the body which is the die face work area for the compression die, an elongated hard steel insert piece welded to and fixed within a recess pocket of complementary shape formed within said mild steel body, said insert piece having a depth equal approximately to one-half its width and having two plane exposed surfaces which are flush with the inner side face and end face, respectively, and a pair of intersecting bevel planes cutting laterally across both the insert piece and the body member at said die face work area, that portion of one of said bevel planes which is formed across the insert piece defining a die face the width of which is predetermined by the relative widths of the bevel planes with relation to each other.

5. In a saw tooth shaper, an elongated frame member carrying means for supporting the shaper upon the teeth of a saw blade in a fixed position relative to the longitudinal axis of the frame member, a pair of compression dies operatively carried by said frame member for movement laterally with respect to said longitudinal axis and endwise with respect to one another, each of the compression dies having a mild steel body bounded on two sides by a plane end face and a plane inner side face, said plane faces intersecting at a die face work area and together forming one corner of the die body, and an elongated insert piece of tool steel welded to and fixed within a pocket of complementary shape recessed in the mild steel body, two of the faces of each insert lying flush with the respective plane faces of the corresponding die and the remainder of each insert being surrounded by the mild steel body member.

ERNEST R. FERRARI.

References Cited in the file of this patent

UNITED STATES PATENTS

| Number | Name | Date |
|---|---|---|
| 1,843,549 | Firth | Feb. 2, 1932 |
| 1,951,174 | Simons | Mar. 13, 1934 |
| 1,964,972 | Binns | July 3, 1934 |
| 2,201,766 | Ferrari | May 21, 1940 |